United States Patent
Pollack

(10) Patent No.: US 9,267,599 B2
(45) Date of Patent: Feb. 23, 2016

(54) MOTOR VEHICLE PARKING LOCK DEVICE HAVING AT LEAST ONE LOCKING ELEMENT

(75) Inventor: Bernd Pollack, Stuttgart (DE)

(73) Assignee: Daimler AG, Stuttgart (DE)

( * ) Notice: Subject to any disclaimer, the term of this patent is extended or adjusted under 35 U.S.C. 154(b) by 95 days.

(21) Appl. No.: 14/128,404

(22) PCT Filed: Dec. 10, 2011

(86) PCT No.: PCT/EP2011/006252
§ 371 (c)(1),
(2), (4) Date: Dec. 20, 2013

(87) PCT Pub. No.: WO2012/175102
PCT Pub. Date: Dec. 27, 2012

(65) Prior Publication Data
US 2014/0110216 A1   Apr. 24, 2014

(30) Foreign Application Priority Data
Jun. 21, 2011   (DE) .......................... 10 2011 105 068

(51) Int. Cl.
*F16H 63/34* (2006.01)

(52) U.S. Cl.
CPC ........ *F16H 63/3483* (2013.01); *F16H 63/3433* (2013.01); *F16H 63/3491* (2013.01)

(58) Field of Classification Search
CPC ............ F16H 63/3433; F16H 63/3483; F16H 63/3491
See application file for complete search history.

(56) References Cited

U.S. PATENT DOCUMENTS

| 3,610,004 A * | 10/1971 | Neese .............................. 70/218 |
| 2007/0125619 A1 | 6/2007 | Berger et al. |
| 2007/0283735 A1 | 12/2007 | Schweiher et al. |
| 2008/0236967 A1 | 10/2008 | Mayr |
| 2011/0023647 A1 | 2/2011 | Engel et al. |

FOREIGN PATENT DOCUMENTS

| DE | 10 2005 060 583 A1 | 6/2007 |
| DE | 10 2006 049 639 A1 | 4/2008 |
| DE | 10 2008 011 898 A1 | 9/2009 |
| EP | 1 855 033 A2 | 11/2007 |
| JP | 2008-128444 A | 6/2008 |

OTHER PUBLICATIONS

International Search Report (PCT/ISA/210) with English translation dated Feb. 22, 2012 (Seven (7) pages).
German-Language Written Opinion dated Feb. 22, 2012 (9 pages).

* cited by examiner

*Primary Examiner* — Richard Lorence
(74) *Attorney, Agent, or Firm* — Crowell & Moring LLP

(57) ABSTRACT

A motor vehicle parking lock device has at least one locking element for locking a parking lock piston in a positive-fit manner and a release unit having at least one electromagnetic actuator for releasing the parking lock piston. The release unit has a hydraulic and/or pneumatic actuator acting parallel to the electromagnetic actuator and which releases the parking lock piston at least in the event of a failure of the electromagnetic actuator.

4 Claims, 1 Drawing Sheet

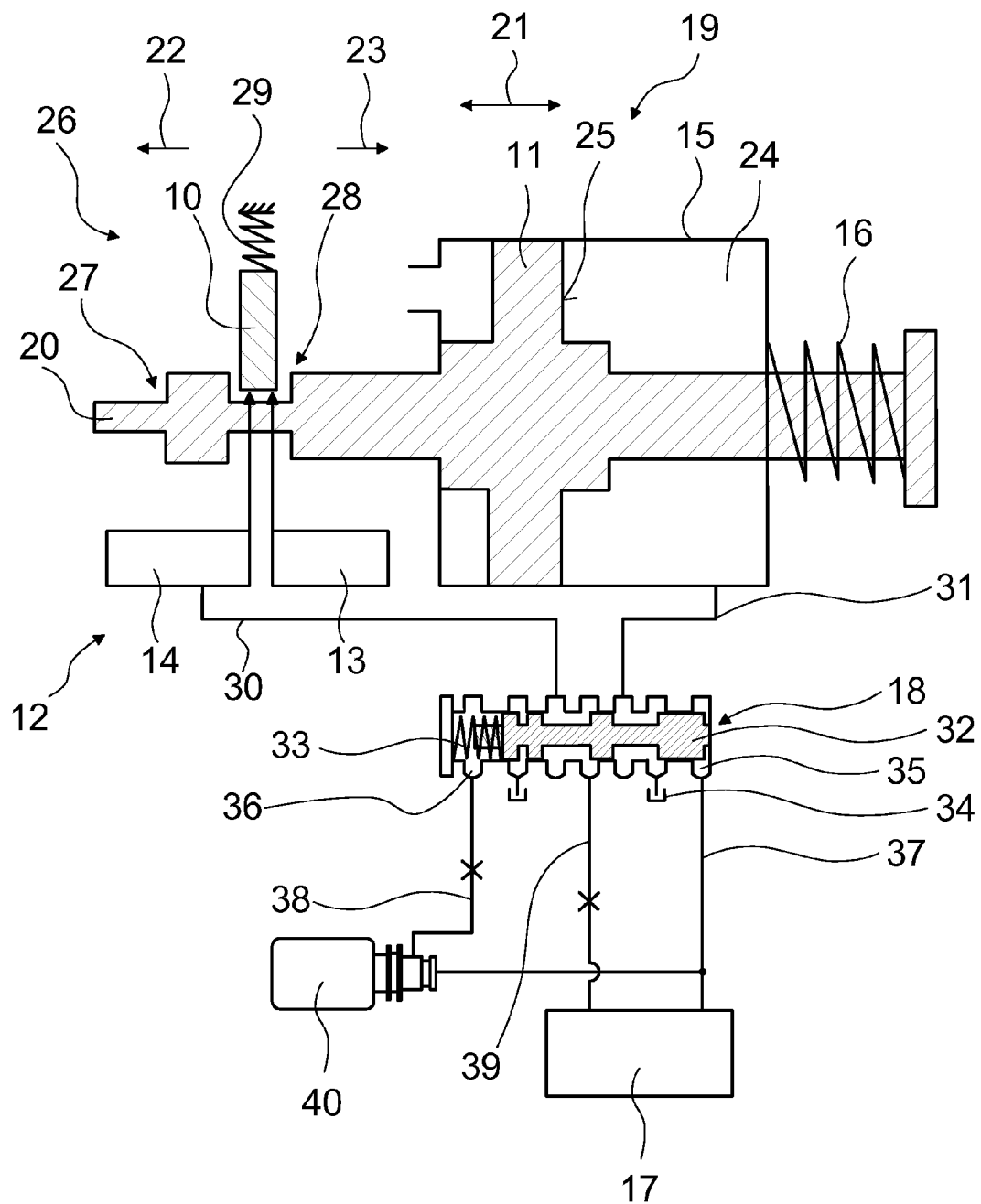

MOTOR VEHICLE PARKING LOCK DEVICE HAVING AT LEAST ONE LOCKING ELEMENT

BACKGROUND AND SUMMARY OF THE INVENTION

Exemplary embodiments of the present invention relate to a motor vehicle parking lock device.

German patent document DE 10 2005 060 583 A1 discloses a motor vehicle parking lock device having a locking element for locking a parking lock piston in a positive-fit manner, and having a release unit having at least one electromagnetic actuator for releasing the parking lock piston.

German patent document DE 10 2006 049 639 A1 discloses a parking lock device that is locked by means of a hydraulic or pneumatic actuator.

European patent document EP 1 855 033 A2 discloses a motor vehicle parking lock device having a parking lock piston which is hydraulically or pneumatically actuatable and having a locking device, wherein the parking lock piston may be brought into the parking position by means of a spring.

U.S. patent document US 2007/125619 A1 discloses a motor vehicle parking lock device having at least one locking element for locking a parking lock piston in a positive-fit manner, and having a release unit that has at least one electromagnetic actuator for releasing the parking lock piston. The release unit has a second actuator acting parallel to the electromagnetic actuator and which is provided for releasing the parking lock piston at least in the event of a failure of the electromagnetic actuator.

Exemplary embodiments of the present invention are directed to a simple motor vehicle parking lock device.

Exemplary embodiments of the present invention are directed to a motor vehicle parking lock device having at least one locking element for locking a parking lock piston in a positive-fit manner, and having a release unit, which has at least one electromagnetic actuator for releasing the parking lock piston.

In accordance with exemplary embodiments of the present invention the release unit has a hydraulic and/or pneumatic actuator acting parallel to the electromagnetic actuator and which releases the parking lock piston at least in the event of a failure of the electromagnetic actuator. Redundant release of the parking lock piston may thus be achieved, so that the parking lock piston may be released in a particularly advantageous manner, even in the event of a failure and/or a defect of the electromagnetic actuator. A design of the motor vehicle parking lock device may thus be simplified, so that the motor vehicle parking lock device may be designed for a fairly large operating range in a particularly simple manner. A robust, simple motor vehicle parking lock device may be provided in this way. A "parking lock piston" should be understood as an axially movable piston which is movably coupled to a parking lock pawl for engaging and disengaging a parking lock. The term "locking the parking lock piston" should be understood as an axial fixing of the parking lock piston, and thus a retention of an engaged or disengaged state of the parking lock. The term "release of the parking lock piston" should be understood as a detachment of the axial fixing of the parking lock piston. In the present context, the term "parallel" should be understood as a magnetic force that is generatable by the electromagnetic actuator and a hydraulic and/or pneumatic force that is generatable by the hydraulic and/or pneumatic actuator have the same effect, specifically, release of the parking lock piston, whereby the release in each case may be carried out by the electromagnetic actuator or by the hydraulic and/or pneumatic actuator. The term "provided" should be understood as specially programmed, designed, equipped, and/or situated.

Further, in accordance with exemplary embodiments of the present invention, the locking element has a positive-fit contour provided for locking the parking lock piston in a hydraulically and/or pneumatically non-overpressurable manner. Reliable locking of the parking lock piston may thus be achieved, so that unintentional release of the parking lock piston may be avoided. The term "in a hydraulically and/or pneumatically non-overpressurable manner" should be understood as meaning that a release of the parking lock piston due to a hydraulic and/or pneumatic force acting on the parking lock piston that is provided for switching the parking lock piston is not possible.

Additionally, the motor vehicle parking lock device has a single-acting actuating cylinder that is provided for switching the parking lock piston into a non-parking position, and has a spring which is provided for switching the parking lock piston into a parking position. The motor vehicle parking lock device may be simplified in this way. A "single-acting actuating cylinder" should be understood as an actuating cylinder that is provided solely for forming a single pressure chamber that is provided for the hydraulic and/or pneumatic switching of the parking lock piston. The term "pneumatic switching of the parking lock piston" should be understood as an axial displacement of the parking lock piston into an axial position associated with the parking position or the non-parking position. A "parking position" should be understood as a position in which a parking lock is engaged. A "non-parking position" should be understood as a position in which the parking lock is disengaged and/or is designed as a driving position. A "pressure chamber" should be understood as a chamber which includes at least one stationary wall and at least one movable wall and which may be acted on hydraulically and/or pneumatically.

In particular, it is advantageous for the motor vehicle parking lock device to have an operating medium pressure supply, and a switching valve which in a first valve position fluidically connects the hydraulic and/or pneumatic actuator to the operating medium pressure supply, and in a second valve position fluidically connects the actuating cylinder to the operating medium pressure supply. The parking position and the non-parking position may thus be switched in a particularly advantageous manner. An "operating medium pressure supply" should be understood as a unit composed of hydraulic and/or pneumatic elements, for example a pump, a switching valve, a line, a diaphragm, and/or the like, which is/are necessary for supplying the switching valve with an operating medium.

It is also advantageous when the locking element is provided for locking the parking lock piston in the parking position and in the non-parking position. A particularly advantageous motor vehicle parking lock device may thus be provided in which the parking lock piston may be reliably locked in the parking position and in the non-parking position.

Furthermore, exemplary embodiments of the present invention are directed to a method for releasing a parking lock piston of a motor vehicle parking lock device, in particular a motor vehicle parking lock device according to the invention, in which the parking lock piston is released by an electromagnetic actuator and/or by a hydraulic and/or pneumatic actuator. An emergency release may thus be achieved in a particularly simple manner.

In addition, for the method a parking lock piston locked in a non-parking position is released by the hydraulic and/or pneumatic actuator, and a parking lock piston that is locked in a parking position is released by the electromagnetic actuator. An advantageous release of the parking position and of the non-parking position may be achieved in this way.

Further advantages result from the following description of the drawing.

BRIEF DESCRIPTION OF THE DRAWING FIGURES

FIG. 1 schematically illustrates a motor vehicle parking lock device in accordance with exemplary embodiments of the present invention.

One exemplary embodiment of the invention is illustrated in the drawing. The drawing, the description, and the claims contain numerous features in combination. Those skilled in the art will also advantageously consider the features individually and combine them into further meaningful combinations.

DETAILED DESCRIPTION

FIG. 1 shows a schematic illustration of a motor vehicle parking lock device according to the invention. The motor vehicle parking lock device is part of an automatic transmission device, not illustrated in greater detail, having a parking lock. The transmission device is designed as a motor vehicle transmission device. The motor vehicle parking lock device is provided for blocking a gearwheel set, not illustrated in greater detail, of the transmission device, or a shaft, not illustrated in greater detail, of the transmission device by means of a parking lock pawl.

The motor vehicle parking lock device has an operating medium pressure supply 17 for providing an operating medium, and thus an operating medium pressure. The operating medium pressure supply 17 is provided for setting a working pressure and a control pressure. The operating medium pressure supply sets a constant control pressure that is limited by the working pressure. In this regard, a "control pressure which is limited by the working pressure" should be understood as a control pressure corresponding to the working pressure up to a maximum value. In principle, the operating medium pressure supply 17 may also set a constant control pressure corresponding to the working pressure.

The operating medium pressure supply 17 includes two pumps, not illustrated in greater detail. One of the pumps is designed as a primary pump mechanically coupled to an engine of a motor vehicle that has the motor vehicle parking lock device. The other pump is designed as an additional pump that is provided for assisting the primary pump or for providing the operating medium when the engine is switched off. The additional pump is designed as an electric pump. The pumps are each designed as an oil pump.

The motor vehicle parking lock device has a hydraulic actuating unit 19 for switching the parking lock. The actuating unit 19 has a parking position in which the parking lock is engaged, and a non-parking position in which the parking lock is disengaged. In the parking position the parking lock is activated, and in the non-parking position the parking lock is deactivated.

The actuating unit 19 has a single-acting design. For switching the parking lock, the actuating unit 19 includes a single-acting actuating cylinder 15, a single side-acting parking lock piston 11, and an actuating element 20. The actuating cylinder 15 is provided for switching, and thus for moving, the parking lock piston 11 into the non-parking position. The parking lock piston 11 is situated so as to be axially displaceable in the actuating cylinder 15. The parking lock piston 11 is fixedly connected to the actuating element 20. The parking lock piston and the actuating element have a one-piece design. The parking lock piston 11 is movably coupled to the parking lock pawl by means of the actuating element 20. By means of the parking lock piston 11, the actuating element 20 is axially displaceable in two mutually opposite switching directions 22, 23 along its main direction of extension 21. The actuating element 20 actuates the parking lock pawl. The switching direction 22 is associated with the non-parking position; i.e., an axial movement of the parking lock piston 11, and thus of the actuating element 20, in the switching direction 22 results in disengagement of the parking lock. The switching direction 23 is associated with the parking position; i.e., an axial movement of the parking lock piston 11, and thus of the actuating element 20, in the switching direction 23 results in engagement of the parking lock. The actuating element 20 is designed as an actuating rod.

The actuating unit 19 has a pressure chamber 24 for hydraulically setting the non-parking position. The pressure chamber 24 is provided for switching the non-parking position, and thus for disengaging the parking lock. The actuating element 20 is axially displaceable in the switching direction 22 by an action of pressure by the pressure chamber 24. The pressure chamber 24 is formed by the actuating cylinder 15 and the parking lock piston 11 situated in the actuating cylinder 15. The actuating cylinder 15 movably accommodates the parking lock piston 11 for forming the single pressure chamber 24. The pressure chamber 24 is formed by the actuating cylinder 15 and a contact surface 25 of the parking lock piston 11 facing away from the actuating element 20. The contact surface 25 is formed as a movable wall of the pressure chamber 24. The contact surface 25 of the parking lock piston 11 converts an operating medium pressure prevailing in the pressure chamber 24 into an actuating force on the parking lock piston 11, and thus on the actuating element 20.

The actuating unit 19 has a spring 16 for the mechanical automatic switching of the parking lock piston 11 into the parking position. The spring is provided for automatically setting the parking position. The spring 16 is provided for pressureless setting of the parking position, and thus for setting the parking position without hydraulic assistance. The spring 16 is functionally situated between the actuating cylinder 15 and the parking lock piston 11, and is situated outside the actuating cylinder 15. An elastic force of the spring 16 acts against the force generated in the pressure chamber 24 by the operating medium pressure. The elastic force of the spring 16 acts in the switching direction 23. The spring 16 is provided for setting the parking position when the pressure chamber 24 is pressureless. In principle, the spring 16 may also be hydraulically assisted for setting the parking position.

The motor vehicle parking lock device has a mechanical locking unit 26 for locking the actuating unit 19, and thus for locking the parking lock piston 11. The mechanical locking unit is provided for detent locking of the actuating unit 19, and thus of the parking lock piston 11. The locking unit 26 is provided for locking the parking lock piston 11 in the parking position, and thus for locking an engaged parking lock, and for locking the parking lock piston 11 in the non-parking position, and thus for locking a disengaged parking lock. The locking unit 26 has a hydraulically non-overpressurable design. The locking unit is not releasable as the result of a force in the pressure chamber 24 acting on the parking lock piston 11.

The locking unit 26 includes two positive-fit contours 27, 28 which are introduced into the actuating element 20. The actuating element 20 forms the positive-fit contours 27, 28.

The positive-fit contour 27 is associated with the parking position, and the positive-fit contour 28 is associated with the non-parking position. The positive-fit contours 27, 28 each have a bevel-free design; i.e., they have no striking surfaces that are provided for frictionally engaged locking, and thus for hydraulically overpressurable locking.

The locking unit 26 has a locking element 10 for the positive-fit locking of the parking lock piston 11 in the parking position and in the non-parking position. The locking element 10 locks the parking lock piston 11 in the parking position or in the non-parking position as needed. In the parking position the locking element 10 engages with the positive-fit contour 27. In the non-parking position the locking element 10 engages with the positive-fit contour 28. The parking lock piston 11 is locked in a positive-fit and hydraulically non-overpressurable manner due to engagement of the locking element 10 with one of the positive-fit contours 27, 28. The locking element 10 has a positive-fit contour which corresponds to the positive-fit contours 27, 28. The positive-fit contour of the locking element 10 locks the parking lock piston 11 in a hydraulically non-overpressurable manner. The positive-fit contour of the locking element 10 has a bevel-free design, and has no striking surfaces which result in non-overpressurable locking. When the locking element 10 is engaged, a vertical wall of the positive-fit contour of the locking element 10 contacts a vertical wall of the corresponding positive-fit contour 27, 28. The locking unit 26 also has a spring 29 that presses the locking element 10 against the actuating element 20. The spring 29 pushes the positive-fit contour of the locking element 10 into the respective positive-fit contour 27, 28. A locking force acting on the parking lock piston 11, which is locked in the parking or non-parking position, results from the locking element 10 and the elastic force of the spring 16.

The motor vehicle parking lock device has a release unit 12 for releasing the parking lock piston 11. The release unit 12 has an electromagnetic actuator 13 and a hydraulic actuator 14 for redundant release. The electromagnetic actuator 13 and the hydraulic actuator 14 are each provided for releasing the parking lock piston 11. The parking lock piston 11 may be released by the electromagnetic actuator 13 or by the hydraulic actuator 14. For switching the parking position, the parking lock piston is released by the hydraulic actuator 14, and for switching the non-parking position is released by the electromagnetic actuator 13. The parking lock piston 11, which is locked in the non-parking position, is released by the hydraulic actuator 14, and the parking lock piston 11, which is locked in the parking position, is released by the electromagnetic actuator 13.

For releasing the parking lock piston 11, the electromagnetic actuator 13 provides a magnetic force acting on the locking element 10. The electromagnetic actuator releases the parking lock piston 11 for switching the non-parking position. The electromagnetic actuator 13 releases the parking lock piston 11, which is locked in the parking position. For the release, the electromagnetic actuator 13 provides a magnetic force acting against an elastic force of the spring 29. For the release, the electromagnetic actuator 13 detaches a positive-fit connection between the locking element 10 and the parking lock piston 11, and pushes or pulls the locking element 10 from the positive-fit contour 27. For the release by means of the electromagnetic actuator 13, a control and regulation unit, not illustrated in greater detail, of the motor vehicle parking lock device energizes the electromagnetic actuator 13, thus detaching the positive-fit connection. The electromagnetic actuator 13 is designed as a solenoid.

The hydraulic actuator 14 acts parallel to the electromagnetic actuator 13. For releasing the parking lock piston 11, the hydraulic actuator 14 provides a hydraulic force acting on the locking element 10. For switching the parking position, the hydraulic actuator releases the parking lock piston 11. The hydraulic actuator 14 releases the parking lock piston 11, which is locked in the non-parking position. For the release, the hydraulic actuator 14 provides a hydraulic force acting against the elastic force of the spring 29. For the release, the hydraulic actuator 14 detaches a positive-fit connection between the locking element 10 and the parking lock piston 11. The hydraulic actuator pushes or pulls the locking element 10 from the positive-fit contour 28. The hydraulic actuator 14 has a pressure chamber for providing the hydraulic force, and thus for the hydraulic release. The parking lock piston 11 is releasable by an action of pressure by the pressure chamber of the hydraulic actuator 14. A contact surface of the pressure chamber of the hydraulic actuator 14 converts an operating medium pressure prevailing in the pressure chamber into a release force on the locking element 10, the release force acting against the elastic force of the spring 29.

In principle, the actuator 14 may also be designed as a pneumatic actuator. In principle, the electromagnetic actuator 13 may also be provided for releasing the parking lock piston 11 that is locked in the non-parking position, and thus may simultaneously act on the locking element 10, in parallel with the hydraulic actuator 14, for releasing the parking lock piston 11 which is locked in the non-parking position. The parking lock piston 11, which is locked in the non-parking position, may thus be released, even in the event of a failure of the electromagnetic actuator 13. The hydraulic actuator 14 is thus provided for releasing the parking lock piston 11 in the event of a failure of the electromagnetic actuator 13, and thus for emergency release. The hydraulically non-overpressurable locking unit 26 is disengaged in such a way that the locking of the parking position and of the non-parking position may be detached only by means of the electromagnetic actuator 13 or by means of the hydraulic actuator 14.

The motor vehicle parking lock device has an automatically switching valve 18 for supplying the pressure chamber 24 and the pressure chamber of the hydraulic actuator 14 with the working pressure. The switching valve 18 has a first valve position and a second valve position. In the first valve position, the switching valve 18 fluidically connects the hydraulic actuator 14 to the operating medium pressure supply 17 and fluidically disconnects the actuating cylinder 15 from the operating medium pressure supply 17 (see FIG. 1). In the first valve position, the switching valve 18 supplies the pressure chamber of the hydraulic actuator 14 with the working pressure. In the second valve position, the switching valve 18 fluidically connects the actuating cylinder 15 to the operating medium pressure supply 17 and fluidically disconnects the hydraulic actuator 14 from the operating medium pressure supply 17. In the second valve position, the switching valve 18 supplies the pressure chamber 24 of the actuating cylinder 15 with the working pressure. The first valve position is associated with the parking position, and the second valve position is associated with the non-parking position. For switching the parking position, the switching valve 18 supplies the pressure chamber of the hydraulic actuator 14 with the working pressure, and for switching the non-parking position, supplies the pressure chamber 24 of the actuating cylinder 15 with the working pressure. The switching valve 18 is fluidically connected to the hydraulic actuator 14 by means of an operating medium pressure line 30. In addition, the switching valve 18 is fluidically connected to the actuating cylinder 15 by means of an operating medium pressure line 31.

The switching valve 18 has a switch slide 32 and a spring 33, the spring 33 being functionally connected to the switch slide 32. The spring 33 is provided for automatically displacing the switch slide 32 into the first valve position, and thus automatically switching the first valve position of the switching valve 18. In the first valve position, the switching valve 18 connects the pressure chamber 24 of the actuating cylinder 15 to a pressureless operating medium reservoir 34. In the first valve position, the switching valve fluidically connects the operating medium pressure line 31 to the pressureless operating medium reservoir 34.

The switching valve 18 has a first control volume 35 for providing a force acting against the spring 33. The first control volume 35 acts against an elastic force of the spring 33. The force in the first control volume 35 is provided for pushing the switch slide 32 against the elastic force of the spring 33, and thus for pushing the switch slide from the first valve position. The force is provided for displacing the switch slide 32 into the second valve position. The force in the first control volume 35 is designed as an operating medium pressure acting against the elastic force of the spring 33. The force is designed as the constant control pressure, which is limited by the working pressure. The first valve position is thus designed as a normal position, and the second valve position is designed as a switching position, of the switching valve 18.

The switching valve 18 has a second control volume 36 for providing a force acting with the spring 33. The second control volume 36 acts against the first control volume 35. The two control volumes 35, 36 are situated opposite one another. The second control volume 36 acts in addition to the elastic force of the spring 33, and acts in the same direction as the elastic force of the spring 33. The force in the second control volume 36 is provided for pushing the switch slide 32 against the first control volume 35, and thus for pushing the switch slide from the second valve position. The force is provided for displacing the switch slide 32 into the first valve position. The force in the second control volume 36 is designed an operating medium pressure acting with the elastic force of the spring 33 and acts against the force in the first control volume 35. The force is designed as the constant control pressure, which is limited by the working pressure. The spring 33 is situated in the second control volume 36.

The motor vehicle parking lock device has a pilot pressure line 37 for supplying the first control volume 35 of the switching valve 18 with the constant control pressure. The pilot pressure line 37 fluidically connects the operating medium pressure supply 17 to the first control volume 35. The operating medium pressure supply 17 is provided for setting the constant control pressure, which is limited by the working pressure, in the pilot pressure line 37, and thus in the first control volume 35 of the switching valve 18.

The motor vehicle parking lock device has a pilot pressure line 38 for supplying the second control volume 36 of the switching valve 18 with the constant control pressure. The pilot pressure line 38 fluidically connects the operating medium pressure supply 17 to the second control volume 36. The operating medium pressure supply 17 is provided for setting the constant control pressure, which is limited by the working pressure, in the pilot pressure line 38, and thus in the second control volume 36 of the switching valve 18.

The motor vehicle parking lock device has a working pressure line 39 for supplying the hydraulic actuator 14 and the actuating cylinder 15 with the working pressure. The operating medium pressure supply 17 is provided for setting the working pressure in the working pressure line 39. The operating medium pressure supply is provided for setting the working pressure in the working pressure line 39 for switching the non-parking position, and in another operating state, for releasing the parking lock piston 11, which is locked in the non-parking position. In the first valve position, the switching valve 18 fluidically connects the working pressure line 39 to the pressure chamber of the hydraulic actuator 14, and in the second valve position fluidically connects the working pressure line 39 to the pressure chamber 24.

The motor vehicle parking lock device has an externally controllable control valve 40 for switching the second valve position of the switching valve 18, and thus for fluidically connecting the pressure chamber 24 to the working pressure line 39. The control valve 40 is provided for setting the control pressure in the second control volume 36. For setting the control pressure in the second control volume 36, the control valve 40 fluidically connects and disconnects the pilot pressure line 38 to/from the operating medium pressure supply 17. For switching the first valve position, the control valve 40 connects the operating medium pressure supply 17 to the pilot pressure line 38, and thus to the second control volume 36. For switching the second valve position, the control valve 40 disconnects the operating medium pressure supply 17 from the pilot pressure line 38, and thus from the second control volume 36. The control valve 40 is provided for fluidically disconnecting the pilot pressure line 38, which is fluidically connected to the control volume 36 of the switching valve 18, from the pilot pressure line 37 in one operating state, and for fluidically connecting to the pilot pressure line 37 in another operating state. The control valve 40 fluidically connects the two pilot pressure lines 37, 38 to one another as a function of an external signal from the control and regulation unit, so that the spring 33 automatically switches the first valve position of the switching valve 18, or fluidically disconnects the two pilot pressure lines 37, 38 from one another, as the result of which the constant control pressure in the first control volume 35 of the switching valve 18 overpressures the spring 33 and switches the second valve position of the switching valve 18. The control valve 40 is provided for switching between the parking position and the non-parking position without a mechanical coupling between the operation and the mechanics, whereby the parking lock piston 11, which is locked in the non-parking position, is directly hydraulically released for switching the parking position.

In an operating state in which the parking lock is engaged, and the actuating unit 19 is thus switched into the parking position, for releasing the parking lock piston 11 locked in the non-parking position, the control and regulation unit activates the control valve 40, so that the control valve 40 fluidically connects the pilot pressure lines 37, 38 to one another. The same constant control pressure thus prevails in the second control volume 36 in which the spring 33 is situated, and in the control volume 35 of the switching valve 18, so that the spring 33 immediately automatically displaces the switch slide 32 into the first valve position. The pressure chamber 24 is thus fluidically connected to the pressureless operating medium reservoir 34, and the pressure chamber of the hydraulic actuator 14 is fluidically connected to the working pressure line 39, so that the pressure chamber of the hydraulic actuator 14 is acted on by the working pressure. As a result, a hydraulic release force acting against the elastic force of the spring 29 acts on the locking element 10, so that the locking element 10 is moved from the positive-fit contour 28, and the parking lock piston 11 is released. The spring 16 subsequently automatically displaces or presses the released parking lock piston 11 into the parking position. If the operating medium pressure supply 17 is disconnected, for example due to switching off the engine of the motor vehicle, in the event of a defect of the operating medium pressure supply 17, or upon deactivation of the control valve 40 for switching the second valve position, the spring 29 of the locking unit 26 automatically pushes or presses the locking element 10 into the positive-fit contour 27, thus locking the parking lock piston 11 in the parking position. The parking lock is engaged.

In an operating state in which the parking lock is disengaged, and the actuating unit 19 is thus switched into the non-parking position, the control and regulation unit activates the electromagnetic actuator 13 to release the parking lock piston 11 locked in the parking position. As a result, a magnetic release force acting against the elastic force of the spring 29 acts on the locking element 10, so that the locking element 10 is moved from the positive-fit contour 27, and the parking lock piston 11 is released. When the electromagnetic actuator 13 is activated, the control and regulation unit deactivates the control valve 40, so that the control valve 40 fluidically disconnects the pilot pressure lines 37, 38 from one another. As a result, a higher constant control pressure prevails in the control volume 35 than in the control volume 36, so that the force in the control volume 35 displaces the switch slide 32 into the second valve position. As a result, the pressure chamber 24 is fluidically disconnected from the pressureless operating medium reservoir 34, and the pressure chamber of the hydraulic actuator 14 is fluidically disconnected from the working pressure line 39, the pressure chamber 24 being simultaneously connected to the working pressure line 39, so that the pressure chamber 24 is acted on by the working pressure. As a result, a force acts against the elastic force of the spring 16, so that the parking lock piston 11 is displaced into the non-parking position. For releasing the non-parking position, the control and regulation unit subsequently deactivates the electromagnetic actuator 13, so that the spring 29 automatically displaces the locking element 10 into the positive-fit contour 28 and locks the parking lock piston 11 in the non-parking position. The parking lock is disengaged.

In this exemplary embodiment, the control and regulation unit energizes and thus activates the electromagnetic actuator 13 solely for releasing the parking lock piston 11 that is locked in the parking position. However, the control and regulation unit may also energize and thus activate the electromagnetic actuator 13 for releasing the parking lock piston 11 locked in the parking position, and for releasing the parking lock piston 11 locked in the non-parking position. The hydraulic actuator 14 is thus provided only for emergency release. The hydraulic actuator 14 and the electromagnetic actuator 13 simultaneously provide the release force for switching the parking position, and thus provide a redundant release force. For switching the parking position, a hydraulic force provided by the hydraulic actuator 14 and a magnetic force which is simultaneously provided by the electromagnetic actuator 13 act on the locking element 10. If the electromagnetic actuator 13 now fails due to a defect, the parking lock piston 11, which is locked in the non-parking position, is released solely by the hydraulic actuator 14, so that the parking position may be set even in the event of a failure of the electromagnetic actuator 13.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A motor vehicle parking lock device, comprising:
   at least one locking element configured to lock a parking lock piston in a positive-fit manner;
   a release unit having at least one electromagnetic actuator configured to release the parking lock piston, wherein the release unit has a further actuator acting parallel to the electromagnetic actuator and which is configured to release the parking lock piston at least in an event of a failure of the electromagnetic actuator, wherein the further actuator is a hydraulic or pneumatic actuator;
   a single-acting actuating cylinder configured to switch the parking lock piston into a non-parking position;
   a spring configured to switch the parking lock piston into a parking position;
   an operating medium pressure supply; and
   a switching valve having a first valve position and a second valve position, the switching valve fluidically connects the hydraulic or pneumatic actuator to the operating medium pressure supply when in the first valve position, and fluidically connects the actuating cylinder to the operating medium pressure supply when in the second valve position.

2. The motor vehicle parking lock device according to claim 1, wherein the locking element has a positive-fit contour configured to lock the parking lock piston in a hydraulically or pneumatically non-overpressurable manner.

3. The motor vehicle parking lock device according to claim 1, wherein the locking element is configured to lock the parking lock piston in the parking position and in the non-parking position.

4. A method for releasing a parking lock piston of a motor vehicle parking lock device, wherein the parking lock piston is releasable by an electromagnetic actuator or by a hydraulic or pneumatic actuator, the method comprising:
   releasing the parking lock piston locked in a non-parking position by the hydraulic or pneumatic actuator by the hydraulic or pneumatic actuator providing a force acting against an elastic force of a spring to push or pull a locking element from a positive-fit contour; and
   releasing the parking lock piston locked in a parking position by the electromagnetic actuator.

\* \* \* \* \*